(12) United States Patent
An et al.

(10) Patent No.: US 9,937,931 B2
(45) Date of Patent: Apr. 10, 2018

(54) INPUT DEVICE, VEHICLE HAVING THE INPUT DEVICE, AND METHOD FOR CONTROLLING THE VEHICLE

(71) Applicant: HYUNDAI MOTOR COMPANY, Seoul (KR)

(72) Inventors: Daeyun An, Anyang-si (KR); Seunghyun Woo, Seoul (KR); Jongmin Oh, Ulsan (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 56 days.

(21) Appl. No.: 15/077,559

(22) Filed: Mar. 22, 2016

(65) Prior Publication Data
US 2017/0120931 A1    May 4, 2017

(30) Foreign Application Priority Data
Nov. 2, 2015  (KR) .......................... 10-2015-0152957

(51) Int. Cl.
*B60W 50/10* (2012.01)
*B60K 37/06* (2006.01)

(52) U.S. Cl.
CPC ............. *B60W 50/10* (2013.01); *B60K 37/06* (2013.01); *B60K 2350/1044* (2013.01); *B60K 2350/357* (2013.01); *B60W 2540/04* (2013.01)

(58) Field of Classification Search
CPC .......................... B60W 50/10; B60W 2540/04
USPC .......................... 701/36; 381/56, 58; 340/943
See application file for complete search history.

(56) References Cited

U.S. PATENT DOCUMENTS

| 2014/0015808 A1* | 1/2014 | Palm | ....................... G06F 3/043 345/177 |
| 2014/0240296 A1* | 8/2014 | Kim | ....................... G06F 3/0433 345/177 |

FOREIGN PATENT DOCUMENTS

| JP | 11-316587 A | 11/1999 |
| JP | 2002-013942 A | 1/2002 |
| JP | 2010-266906 A | 11/2010 |
| KR | 20-0249989 Y1 | 11/2001 |
| KR | 10-0803400 B1 | 2/2008 |
| KR | 10-1411650 B1 | 6/2014 |
| KR | 10-2014-0141987 A | 12/2014 |
| KR | 10-1471843 B1 | 12/2014 |
| KR | 10-1558810 B1 | 10/2015 |

OTHER PUBLICATIONS

Korean Notice of Allwoance dated Mar. 16, 2017, issued in Korean Patent Application No. 10-2015-0152957. (w/English translation).

* cited by examiner

*Primary Examiner* — Marthe Y Marc-Coleman
(74) *Attorney, Agent, or Firm* — McDermott Will & Emery LLP

(57) ABSTRACT

An input device includes an input unit having at least one button arranged to produce a sound signal when pressed, a sound collector for collecting the sound signal produced from the button, a memory for storing control command information corresponding to a frequency of the sound signal produced from the button, and a controller for determining a control command corresponding to the frequency of the sound signal produced from the button based on the information stored in the memory, and for sending the control command to a subject to be controlled.

13 Claims, 14 Drawing Sheets

INPUT DEVICE, VEHICLE HAVING THE INPUT DEVICE, AND METHOD FOR CONTROLLING THE VEHICLE

CROSS-REFERENCE TO RELATED APPLICATION(S)

This application claims the benefit of priority, under 35 U.S.C. § 119(a), of a Korean patent application filed on Nov. 2, 2015 with the Korean Intellectual Property Office and assigned Serial No. 10-2015-0152957, the entire disclosure of which is incorporated hereby incorporated by reference.

TECHNICAL FIELD

The present disclosure relates to an input device, a vehicle having the input device, and a method for controlling the vehicle.

BACKGROUND

Vehicles have driving-related capabilities and variables, such as vehicle speed, engine RPM, fuel volume, cooling water, etc., may also include other capabilities than the basic driving capabilities and variables, such as audio, video, navigation, air conditioning, seat control and light control capabilities.

Various input devices may be used to control and/or manipulate the capabilities of the vehicle, and studies are being done regarding the input devices to more easily call for and execute the capabilities for vehicle.

SUMMARY OF THE DISCLOSURE

The present disclosure provides an input device to send a control command to a subject to be controlled by collecting a sound signal produced in manipulating a button, vehicle including the input device, and method for controlling the vehicle.

In accordance with an aspect of the present disclosure, an input device is provided. The input device including: an input unit having at least one button arranged to produce a sound signal when pressed; a sound collector for collecting the sound signal produced from the button; a memory for storing control command information corresponding to a frequency of the sound signal produced from the button; and a controller for determining a control command corresponding to the frequency of the sound signal produced from the button based on the information stored in the memory, and for sending the control command to a subject to be controlled.

The button may be formed to produce a preset sound signal.

The input unit may include a first button to produce a first sound signal; and a second button to produce a second sound signal with a different frequency from that of the first sound signal.

The button may include a button frame that constitutes the body of the button; a button guide that supports the button frame and has a fixer installed on the inner side of the button guide; a pressing shaft installed to protrude backward from the rear side of the button frame and having a projection located on the side of the pressing shaft; and a restoring spring that elastically supports the button frame against the button guide.

The projection may be formed to produce a sound signal by coming into contact with the fixer as the pressing shaft is moving along a first axis.

The button may be removably located.

The controller may be configured to determine a control command corresponding to a frequency of a sound signal produced from the button based on the information stored in the memory no matter where the button is located, and send the control command to the subject to be controlled.

The controller may be configured to convert the sound signal collected by the sound collector to a frequency signal, and classify the frequency signal by frequency region.

The controller may be configured to determine that the input sound signal has a frequency of a classified region if the magnitude of the classified frequency signal exceeds a first threshold.

The controller may be configured to, if frequency signals are detected in a plurality of frequency regions, and the respective magnitudes of the detected frequency signals exceed a first threshold, classify the input sound signal as noise.

In accordance with another aspect of the present disclosure, a vehicle is provided. The vehicle includes an input device including an input unit having at least one button arranged to produce a sound signal when pressed; a sound collector for collecting the sound signal produced from the button; a memory for storing control command information corresponding to a frequency of the sound signal produced from the button; and a controller for determining a control command corresponding to the frequency of the sound signal produced from the button based on the information stored in the memory, and for sending the control command to a subject to be controlled.

The button may be formed to produce a preset sound signal.

The input unit may include a first button to produce a first sound signal; and a second button to produce a second sound signal with a different frequency from that of the first sound signal.

The button may include a button frame that constitutes the body of the button; a button guide that supports the button frame and has a fixer installed on the inner side of the button guide; a pressing shaft installed to protrude backward from the rear side of the button frame and having a projection located on the side of the pressing shaft; and a restoring spring that elastically supports the button frame against the button guide.

The pressing shaft may be formed to produce a sound signal when the projection comes into contact with the fixer as the pressing shaft is moving along a first axis.

The button may be removably located.

The controller may be configured to determine a control command corresponding to a frequency of a sound signal produced from the button based on the information stored in the memory no matter where the button is located, and send the control command to the subject to be controlled.

In accordance with another aspect of the present disclosure, a method for controlling a vehicle that comprises at least one button arranged to produce a sound signal, a sound collector for collecting the sound signal produced from the button, and a memory for storing control command information corresponding to a frequency of the sound signal produced from the button is provided. The method includes collecting a sound signal produced from the button; performing signal processing on the collected sound signal; determining a control command corresponding to the sound signal based on the information stored in the memory; and sending the control command to a subject to be controlled.

Performing signal processing on the collected sound signal may include converting the sound signal to a frequency signal; and classifying the frequency signal by frequency region.

Performing signal processing on the collected sound signal may include determining that an input sound signal has a frequency of a classified region if the magnitude of the classified frequency signal exceeds a first threshold.

Performing signal processing on the collected sound signal may include, if frequency signals are detected in a plurality of frequency regions, and the respective magnitudes of the detected frequency signals exceed a first threshold, determining that the input sound signal corresponds to noise.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

The above and other features and advantages of the present disclosure will become more apparent by describing in detail exemplary embodiments thereof with reference to the attached drawings in which.

Throughout the drawings, like reference numerals will be understood to refer to like parts, components, and structures.

DETAILED DESCRIPTION

Embodiments of an input device, vehicle including the input device, and method for controlling the vehicle will now be described with reference to accompanying drawings.

Figure 1:
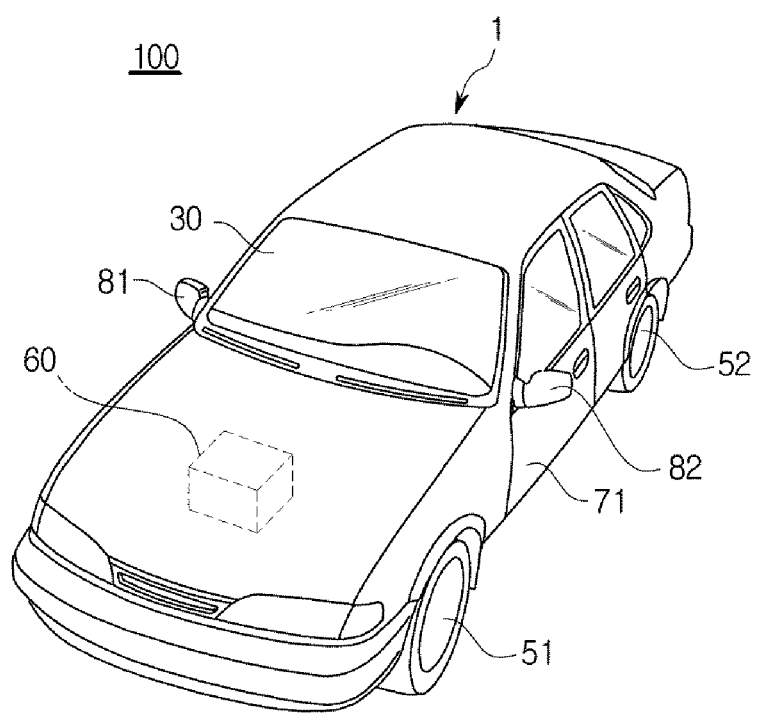
FIG. 1 shows an exterior of a vehicle, according to an embodiment of the present disclosure.

FIG. 1 shows an exterior of a vehicle 100, according to an embodiment of the present disclosure.

Referring to FIG. 1, the vehicle 100 may include a main body 1 that constitutes an exterior of the vehicle 100, a front glass 30 that allows the driver inside the vehicle 100 to look ahead of the vehicle 100, wheels 51, 52 for moving the vehicle 100, a driving system 60 for turning the wheels 51, 52, doors 71 that shield the inside of the vehicle 100 from outside, and side mirrors 81, 82 that help the driver see areas behind and to the sides of the vehicle 100.

The front glass 30, also termed a windshield glass, is placed on the top front of the main body 100 for securing a front view for a driver inside the vehicle 100.

The wheels 51 and 52 include front wheels 51 and rear wheels 52, and the driving system 60 may provide turning forces to the front wheels 51 or rear wheels 52 to move the vehicle 100 forward or backward. The driving system 60 may employ a motor that produces the turning force from electrical power supplied from a storage battery (not shown) or a combustion engine (not shown) that burns a fuel to create the turning force.

The doors 71 may be pivotally attached onto the left and right sides of the main body 1, and opened for the driver and passenger to get in or get out of the vehicle 100 and closed for shielding the inside of the vehicle 100 from the outside. The doors 71 may have windows 72 installed thereon for the driver and passenger to look in or out through the windows 72. In some embodiments, the windows 72 may be installed to have only one viewable side and/or be opened and closed.

The side mirrors 81 and 82 include a left side mirror 81 and a right side mirror 82 placed on the left and right sides of the main body 1, respectively, for helping the driver obtain views behind and to the side of the vehicle 100.

Figure 2:
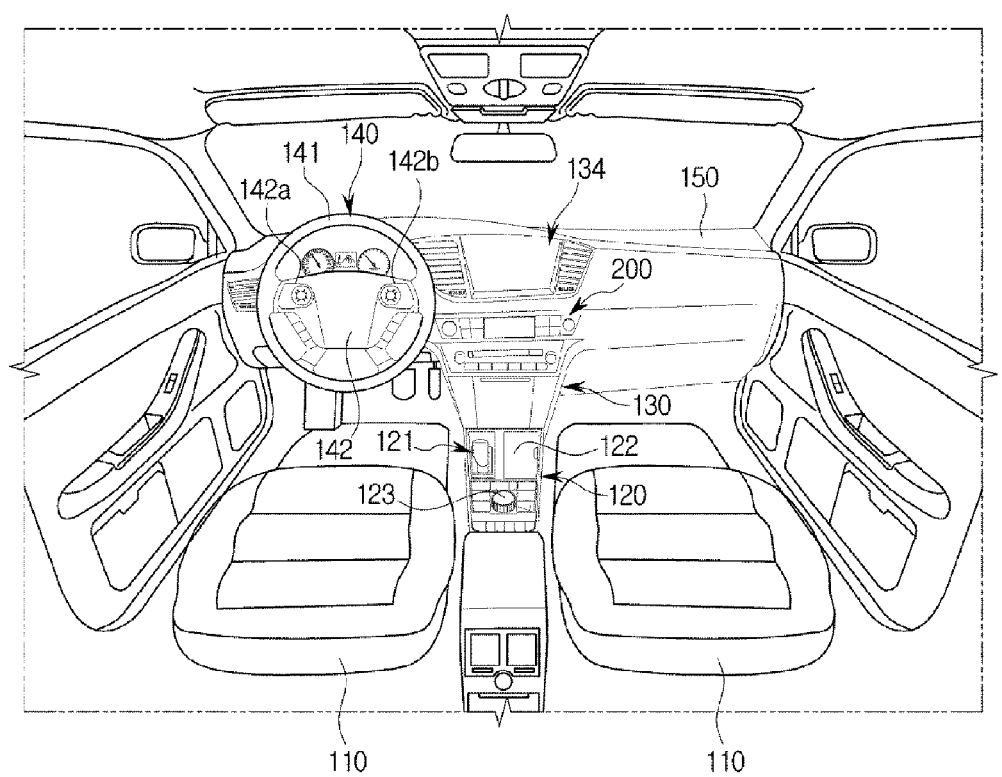
FIG. 2 shows an interior of a vehicle, according to an embodiment of the present disclosure.
Figure 3:
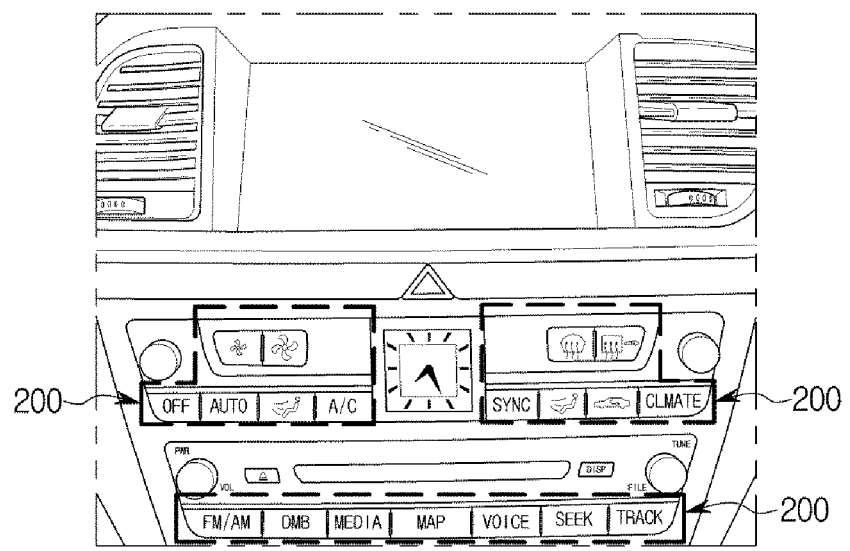
FIG. 3 shows an input device installed in a vehicle, according to an embodiment of the present disclosure.

FIG. 2 shows an interior of the vehicle 100, according to an embodiment of the present disclosure, and FIG. 3 shows an example of an input device 200 installed in the vehicle 100 of FIG. 2.

Referring to FIG. 2, the vehicle 100 may include seats 110 for driver and passengers to sit on, and a dashboard 150 having a gear box 120, a center fascia 140 and a steering wheel 130.

In the gear box 120, a gearshift 121 for shifting gears of the vehicle 100, and a touch pad 122 for controlling functions of the vehicle 100 may be installed, and in some embodiments, a dial controller 123 may be optionally installed.

The steering wheel 140 is a tool for controlling a traveling direction of the vehicle 100, including a rim 141 to be held by the driver and a spoke 142 connected to a steering system of the vehicle 100 for connecting the rim 141 to a hub of a rotation shaft for steering. In an embodiment, control devices 142a, 142b may be formed on the spoke 142 to control various devices, e.g., the audio system.

In the center fascia 130, an input device 200 may be installed to receive control commands for various functions of the vehicle 100 from the user. For example, the input device 200 may receive control commands to control various functions, or systems, of the vehicle 100, including an air conditioner, audio system, etc., from the user.

The input device 200 may be installed below an Audio Video and Navigation (AVN) system 134 of the center fascia 130. However, where the input device 200 is installed is not limited thereto, and the input device 200 may also be installed on the gear box 120, steering wheel 140, etc.

Figure 4:
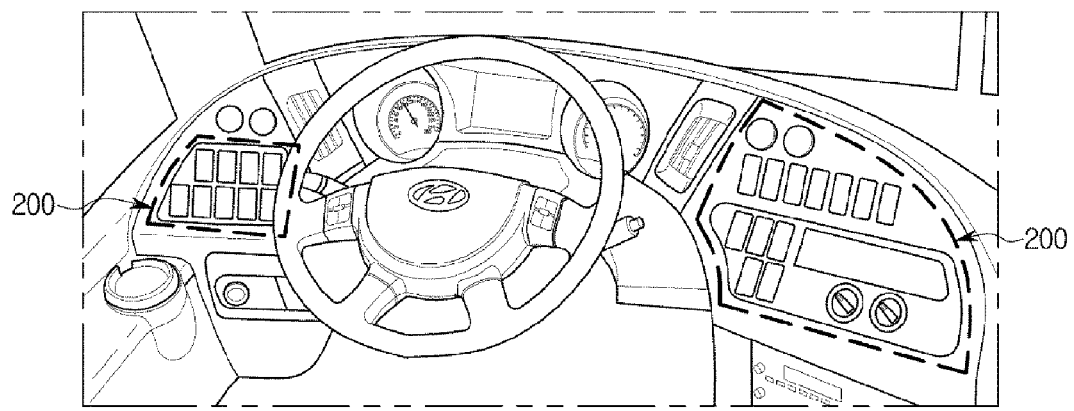
FIG. 4 shows an input device installed in a vehicle, according to another embodiment of the present disclosure.

In another example, referring to FIG. 4, the input device 200 may also be installed on the dashboard of a commercial vehicle. The input device 200 may receive control commands to control various functions or systems of the commercial vehicle, including an air conditioner, audio system, interior lighting system, Bluetooth system, door opening/closing system, etc., from the user.

The input device 200 may also be installed in the cockpit of an airplane, generator control room, studio control booth (mixing room) of a broadcasting station, etc., in addition to the vehicle 100 as shown in FIGS. 1 to 4. For convenience of explanation, the input device 200 will be described in more detail under the assumption that the input device 200 is installed in the vehicle 100 as shown in FIGS. 1 to 3, FIG. 5 schematically shows the input device 200, according to an embodiment of the present disclosure, and FIG. 6 is a control block diagram of the input device 200, according to an embodiment of the present disclosure. The vehicle 100 may include the input device 200 in accordance with an embodiment of the present disclosure, and describing the embodiment below will be focused on the input device 200.

Figure 5:
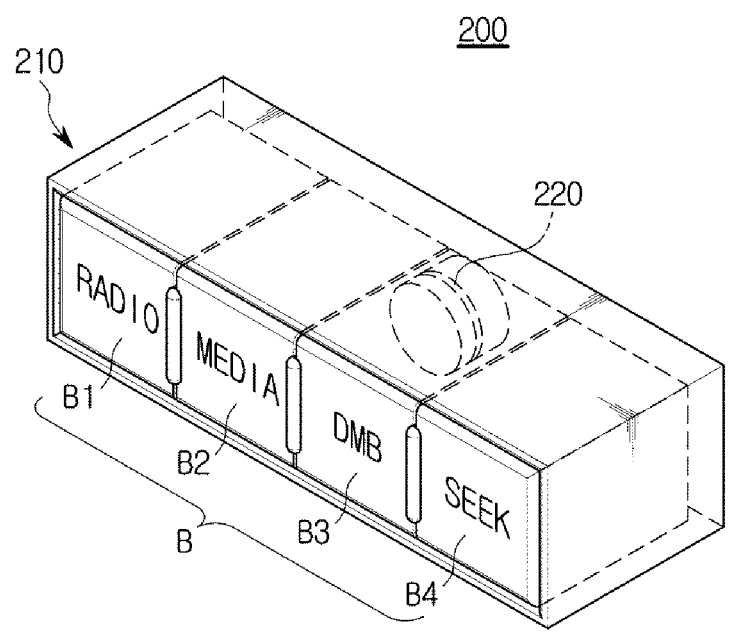
FIG. 5 shows a schematic input device, according to an embodiment of the present disclosure.
Figure 6:
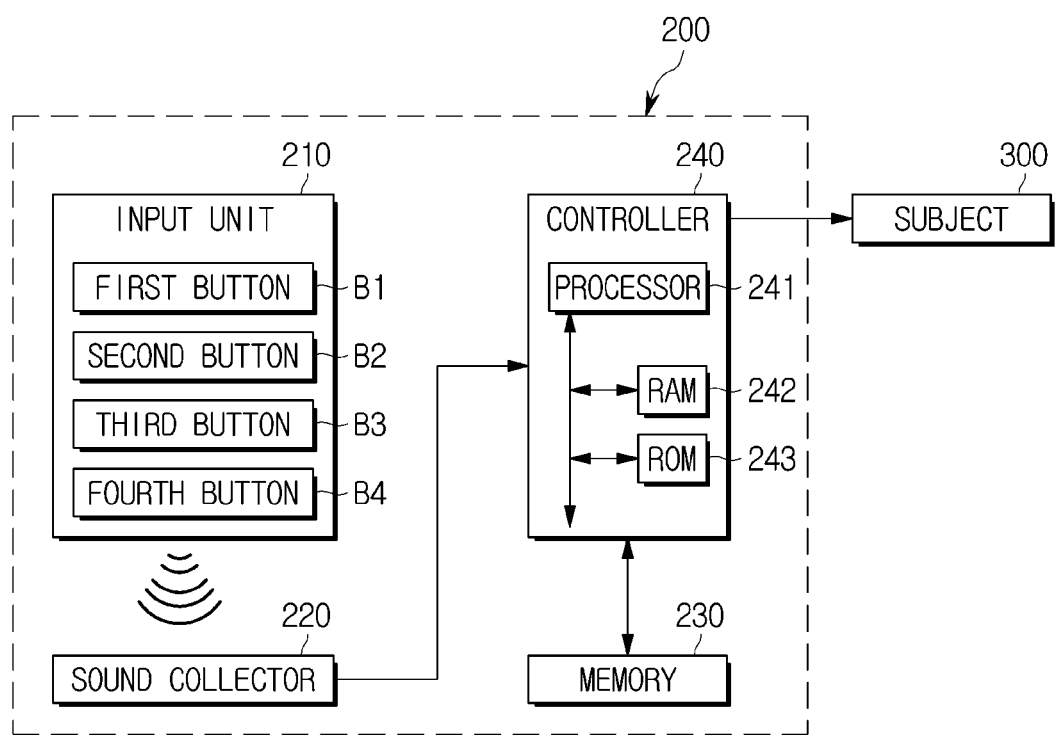
FIG. 6 is a control block diagram of an input device, according to an embodiment of the present disclosure.

Referring to FIGS. 5 and 6, the input device 200 may include an input unit 210, a sound collector 220, a memory 230 and a controller 240.

The input unit 210 may include at least one button B. The input unit 210 may include a single button, or a plurality of buttons. For convenience of explanation, an example of the input unit 210 has first to fourth buttons B1 to B4 in the following description. The number, size, and the shape of the buttons are not limited to those shown in FIG. 5, and may vary depending on the intent of the designer.

The button B may be formed to generate a sound signal when being pressed by the user. More specifically, the respective buttons B may produce respective unique sound signals. For example, the first button B1 may produce a first sound signal, the second button B2 may produce a second sound signal, the third button B3 may produce a third sound signal, and the fourth button B4 may produce a fourth sound signal.

The first to fourth sound signals may have different frequencies. That is, a sound signal produced from the button B may have a preset frequency, hereinafter called unique frequency of the button B.

Figure 7:
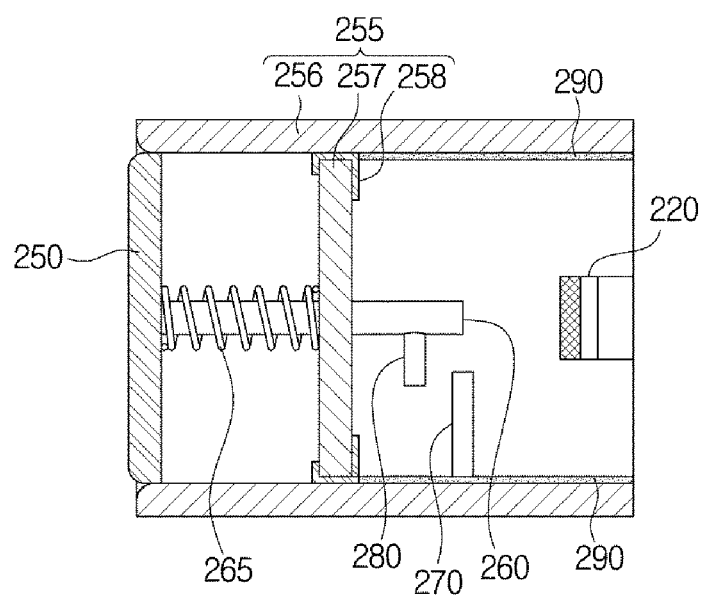
FIG. 7 shows a structure of a button, according to an embodiment of the present disclosure.

The button B may have a structure as shown in FIG. 7.

FIG. 7 shows a structure of the button B, according to an embodiment of the present disclosure.

Referring to FIG. 7, the button B in accordance with an embodiment may include a button frame 250 that constitutes the body of the button B, a button guide 255 that supports the button frame 250 and has a fixer 270 installed on the inner side of the button guide 255, a pressing shaft 260 installed to protrude backward from the rear side of the button frame 250 and having a projection formed on the side of the pressing shaft 260, and a restoring spring 265 that elastically supports the button frame 250 against the button guide 255.

The button frame 250 may have a convex front and open back at a certain height, to constitute the body of the button B. On the button frame 250, a function icon may be formed to tell the function of the button B.

Behind the button frame 250, the pressing shaft 260 may be formed to protrude backward from the button frame 250. On the side of the pressing shaft 260, the projection 280 may be formed to produce a unique sound signal of the button B according to movement of the pressing shaft 260.

The button guide 255 may include a guide frame 256 that constitutes a body in which a button reception groove to receive the button frame 250 is formed, a fixed plate 257 having a through hole formed for the pressing shaft 260 to be inserted into and supported, and a removable means 258 formed to removably fix the fixed plate 257 to the guide frame 256. In some embodiments, the removable means 258 may be omitted and the guide frame 256 and fixed plate 257 may be integrated as one unit.

A sound absorbing member 290 may be arranged on the inner side of the guide frame 256. The sound absorbing member 290 may be formed to minimize interference between a sound signal produced by an operation of the button B and a sound signal produced from the outside of the input device 200. Hereinafter, the sound signal produced from the outside of the input device 200 may be referred to as noise. The sound absorbing member 290 may be formed of a material such as polyurethane fiber, but is not limited thereto.

The fixer 270 may be arranged on the inner side of the guide frame 256. The fixer 270 may produce a sound signal when coming into contact with the projection 280 formed on the pressing shaft 260, and a frequency band of the sound signal may be determined based on the thickness, length, width, and texture of the fixer 270. The thickness, length, width, and texture of the projection 280 may also influence the frequency band of the sound signal, so the following description of parameters of the fixer 270 may correspond to parameters of the projection 280 as well.

An influence of the respective parameters on the frequency band of the sound signal may be represented in the following equation:

$$f = a*h/(t*b) \tag{1}$$

where f refers to a frequency, a refers to a material parameter, h refers to a length of the fixer 270, t refers to a thickness of the fixer 270, and b refers to a width of the fixer 270.

From equation 1, it may be seen that a material with a small parametric value, a short length, a thick thickness, or a large width of the fixer 270 may contribute to producing a sound signal of low frequency band. On the contrary, it may be seen that a material with a large parametric value, a long length, a thin thickness, or a small width of the fixer 270 may contribute to producing a sound signal of high frequency band.

Figure 8:
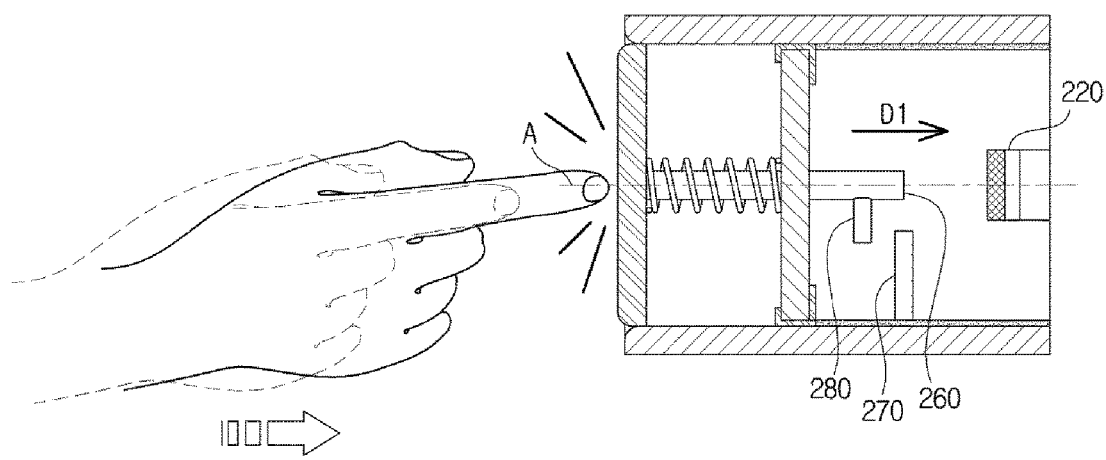
FIGS. 8 and 9 show a principle of producing sound in an input module.
Figure 9:
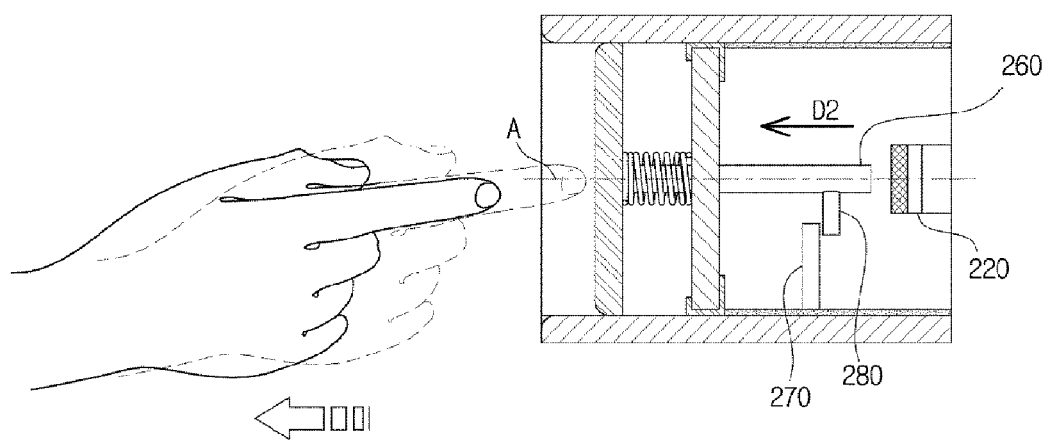

FIGS. 8 and 9 show a principle of producing sound in an input module.

Referring to FIGS. 8 and 9, when the button frame 250 starts to be pressed, the projection 280 formed on the pressing shaft 260 gets closer to the fixer 270 formed on the inner side of the guide frame 256. With continuing pressure, the projector 280 and the fixer 270 join together, and the friction between the projector 280 and the fixer 270 may produce a sound signal.

More specifically, the button frame 250 may be moved in a first direction D1 along a first axis A when being pressed by the user. In this case, the projection 280 formed on the pressing shaft 260 comes into contact with the fixer 270 formed on the inner side of the guide frame 256, to produce a sound signal.

When the user releases the button frame 250, the button frame 250 may be moved in a second direction D2 along the first axis A. The second direction D2 is an opposite direction to the first direction D1. In this case, the projection 280 formed on the pressing shaft 260 contacts the fixer 270 formed on the inner side of the guide frame 256 again, to produce the sound signal.

The sound collector 220 may collect the sound signal produced from the button B and output the collected sound signal to the controller 240.

The sound collector 220 may include a sensor for collecting sound signals of common audible frequency band, about 16 Hz to about 20 kHz. For example, the sound collector 220 may employ at least one of microphones, piezoelectric sensors, and acoustic differential sensors, but is not limited thereto.

The sound collector 220 may use a single sensor to collect sound signals produced from the plurality of buttons B, e.g., B1, B2, B3, and B4. This is beneficial for cost savings as compared to employing a plurality of sensors. The configuration of the sound collector 220 is not limited thereto, but may use a plurality of sensors to collect sound signals produced from the plurality of buttons B, e.g., B1, B2, B3, and B4, in order to improve accuracy of sound recognition.

A memory 230 may store various data, programs, or applications for driving and controlling the input device 200. More specifically, a control program for controlling the input device 200, a dedicated application initially provided by the manufacturer or a universal application downloaded from the outside, and/or the like may be stored in the memory 270.

For example, the memory 230 may store an application or program designed to convert the analog sound signal collected by the sound collector 220 into a digital format, convert the digitally converted sound signal into the frequency domain to analyze the digital sound signal, classify the frequency signal by frequency region, determine whether there is noise in the signal by analyzing the classified frequency signal, determine a control command corresponding to the frequency of the sound signal, and send the control command to a subject 300 to be controlled.

The memory 230 may store the sound signal collected by the sound collector 220, and store frequency region information for the sound signal. Furthermore, the memory 230 may store signal information for each frequency region, and also store control command information corresponding to a particular frequency signal.

For example, the memory 230 may store a first sound signal collected by the sound collector 220, and store a frequency signal for the first sound signal in the frequency domain if the first sound signal is converted from the time domain to the frequency domain. In addition, the memory 230 may store first control command information that matches the frequency domain of the first sound signal.

The memory 230 may include storage media in, or of, at least one type of flash memory, hard disk, multimedia card micro type memory, card type memory (e.g., SD or XD memory), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, magnetic disk, and optical disk. However, the memory is not limited thereto, but may be implemented in any other form known to the ordinary skill in the art.

The controller 240 may control general operation of the input device 200 and signal flows between the internal components of the input device 200, and process the data. Upon reception of the sound signal collected by the sound collector 220 of the input device 200, the controller 240 may execute a control program or associated application stored in the memory 230 for the input device 200.

The controller 240 may include a processor 241, a Read Only Memory (ROM) 243 for storing a control program or application to control the input device 200, and a Random Access Memory (RAM) 242 for storing sound signals or frequency information of the sound signals collected by the sound collector 220 or for being used as a storage area for various tasks performed by the input device 200. It is noted herein that the ROM 243 and RAM 242 of the controller 240 correspond to those of memory 230.

The controller 240 may include a sound recognition processor for processing and analyzing the sound signal collected by the sound collector 220. The controller 240 may include a sound recognition processing board having a sound recognition processor, and RAM or ROM on a separate circuit board electrically connected to the controller 240. The processor, ROM, and RAM may be connected to one another via an internal bus.

Upon reception of a sound signal from the sound collector 220, the controller 240 may control the sound recognition processor to perform signal processing on the sound signal to determine a control command corresponding to the sound signal, and send the control command to the subject 300 to be controlled. The subject 300 to be controlled may include an air conditioning system, audio system, indoor lighting system, Bluetooth system, door opening/closing system, or the like, which is installed in the vehicle 100. However, the subject 300 to be controlled is not limited thereto.

Specifically, once the sound signal is received in the analog form from the sound collector 220, the controller 240 may control an Analog-to-Digital Converter (ADC) to convert the analog sound signal into a digital form.

The controller 240 may perform signal processing to convert the digitally converted sound signal from the time domain to the frequency domain in order to analyze the sound signal. The sound signal may be converted from the time domain to the frequency domain by means of, but not exclusively, a Fast Fourier Transform (FFT) signal processing scheme.

The controller 240 may classify the signal in the frequency domain by frequency region through a filter bank. The filter bank may refer to a group of different band pass filters to divide the frequency band of the sound signal, and the output from the filter bank is used to analyze the sound signal. The frequency band may be divided by about 15 to about 30 filters, but is not limited thereto. The frequency band of each of the band pass filters may be set to be narrower for a low frequency band and wider for a higher frequency band based on audio resolution in terms of acoustics.

The controller 240 may determine whether the magnitude of the frequency signal classified by the filter bank exceeds a first threshold, and determine that the input sound signal has a frequency of the classified region if the magnitude of the frequency signal classified by the filter bank exceeds the first threshold.

If frequency signals are detected in a plurality of filter bank regions, and the respective magnitudes of the detected frequency signals each exceed the first threshold, the controller 240 determines that the input sound signal corresponds to noise and then terminate the signal processing procedure for the sound signal. With this procedure, the controller 240 may prevent the subject 300 to be controlled from malfunctioning due to interference from external noise.

The controller 240 may determine a control command corresponding to the sound signal in the corresponding frequency region based on the frequency signal classified by the filter bank, and send the control command to the subject 300 to be controlled.

As described above, the input device 200 in accordance with an embodiment of the present disclosure may be configured to have a single sensor collect sound signals produced from the plurality of buttons B, e.g., B1, B2, B3, and B4 enabled by a manipulation of the buttons B. In other words, since control commands are determined based on unique frequencies produced from the buttons B themselves, the same functions may be performed no matter where the buttons B are located, and accordingly, the layout of the buttons B may be easily changed.

Figure 10:
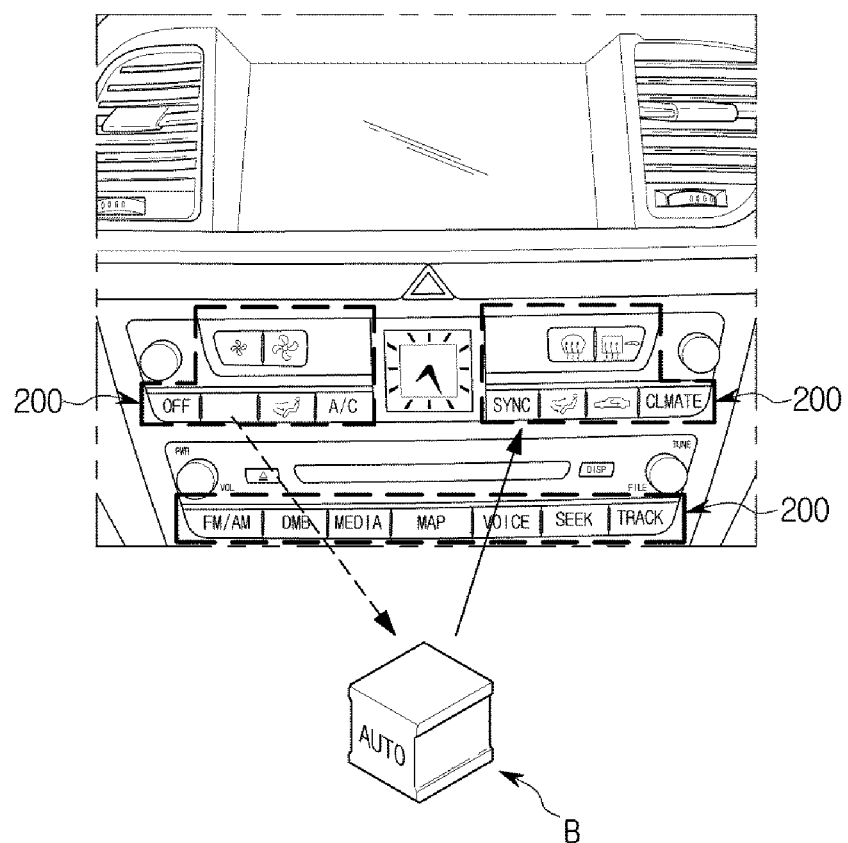
FIGS. 10 to 12 show alternate layouts of buttons of an input device, according to an embodiment of the present disclosure.
Figure 11:
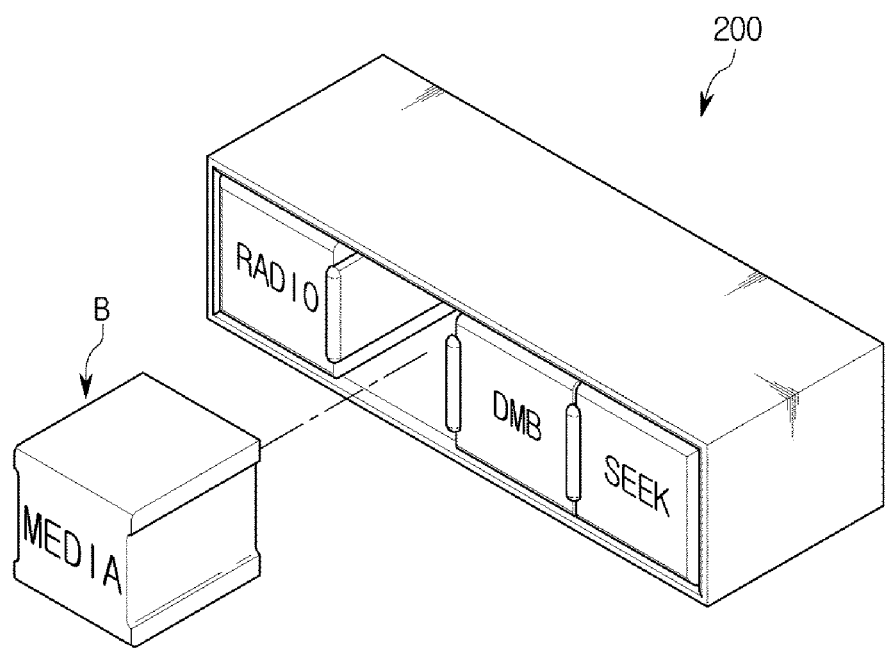
Figure 12:
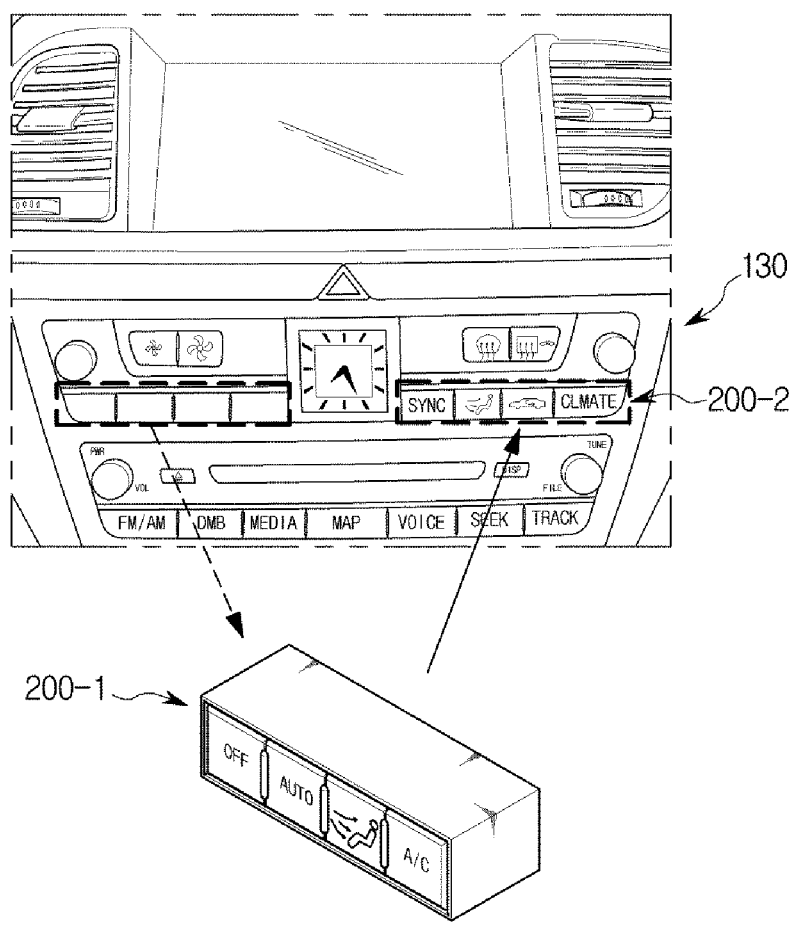

FIGS. 10 to 12 show a change of the layout of buttons B of the input device 200, according to an embodiment of the present disclosure.

Referring to FIG. 10, the input device 200 may freely change the position of a single button B located in the input device 200. In some embodiments where the input device 200 is installed on the center fascia of the vehicle 100, the user may locate frequently-used buttons B in easy-to-use positions within the vehicle 100 according to his/her preference.

Referring to FIG. 11, the input device 200 may freely change or replace one of the plurality of buttons located in the input device 210.

Labels, symbols, etc., on the buttons of the input device 200 may wear out over time, and frequently-used buttons may wear out more rapidly than others do. Therefore, periodical replacement of the buttons may be required. In an embodiment, the input device 200 may manage the status of the buttons in the way that, if replacement of a button is required, only the button may be replaced by a new button B.

Furthermore, if an individual button is to be changed to the user's preference, the layout of the buttons may be maintained to the user's liking by replacing the button only by a new button.

Referring to FIG. 12, the position for the input device 200 to be installed may be freely adjusted. For example, in a case where first and second input devices 200-1 and 200-2 are installed on the center fascia, the user may change the positions of the first and second input devices 200-1 and 200-2 to his/her preference. In some embodiments, the user may remove the first input device 200-1 and place a third input device (not shown) in the same position from which the first input device 200-1 was removed.

The input device 200 and the vehicle 100 including the same in accordance with an embodiment has thus far been described. A method for controlling the vehicle 100 in accordance with an embodiment will now be described. For convenience of explanation, the method for controlling a vehicle will be described given that the input device 200 as described in connection with FIGS. 5 and 6 is installed inside the vehicle 100.

Figure 13:
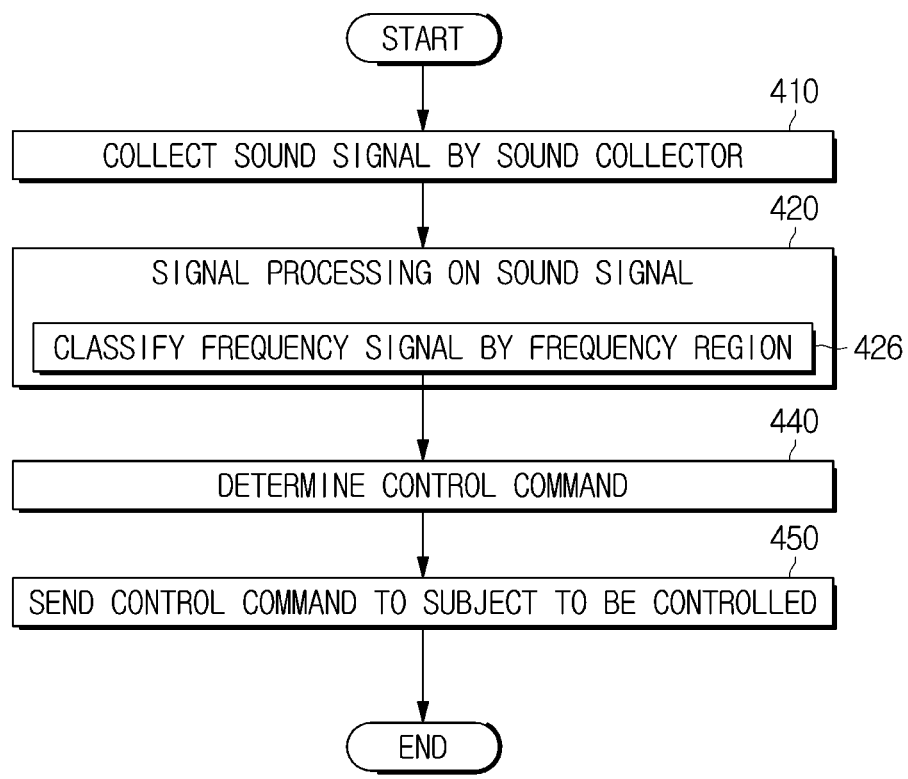
FIGS. 13 and 14 are flowcharts illustrating operations of controlling a vehicle, according to an embodiment of the present disclosure.
Figure 14:
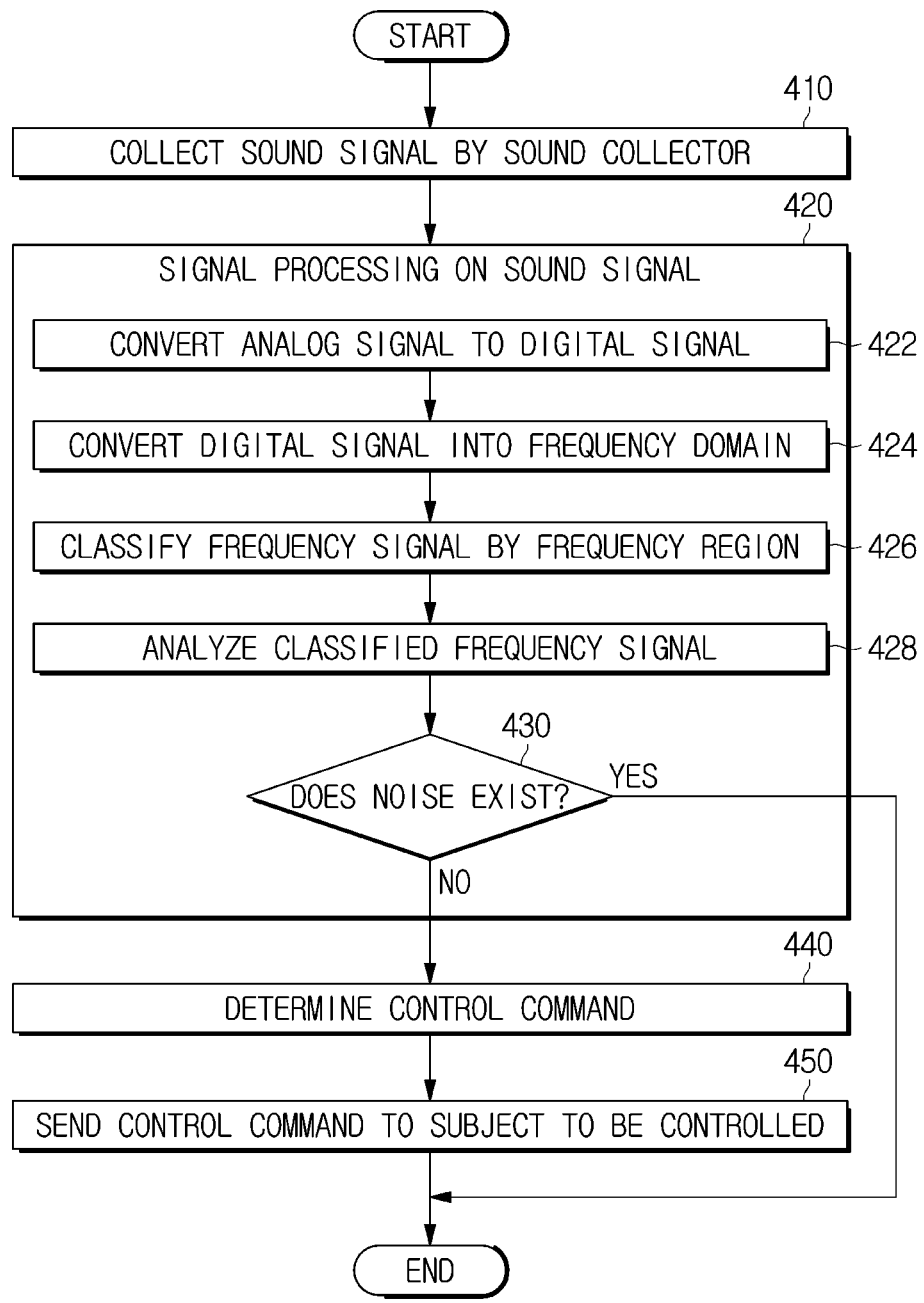

FIGS. 13 and 14 are flowcharts illustrating an operation of controlling a vehicle, according to an embodiment of the present disclosure.

Referring to FIGS. 13 and 14, a method for controlling the vehicle 100 in accordance with an embodiment of the present disclosure includes collecting a sound signal produced from a button in operation 410, performing sound processing on the collected sound signal in operation 420, determining a control command corresponding to the collected sound signal in operation 440, and sending the control command to the subject 300 to be controlled in operation 450.

The operation of collecting a sound signal produced from the button B may include collecting a sound signal through the sound collector 220 arranged around the button B. The sound collector 220 may output the collected sound signal to the controller 240, in operation 410.

Upon reception of the sound signal, the controller 240 may perform signal processing on the collected sound signal, in operation 420. Performing signal processing on the sound signal may further include converting the sound signal to a frequency signal in operations 422, 424, and classifying the frequency signal by frequency region in operation 426. In some embodiments, it may further include analyzing the classified frequency signal in operation 428, and determining whether there is noise in the signal in operation 430.

The operation of converting the sound signal into a frequency signal may include converting the sound signal in the analog format into the digital format in operation 422, and converting the digitally converted sound signal from the time domain to the frequency domain in operation 424.

The operation of classifying the frequency signal by frequency region may include classifying the frequency signal by frequency region by means of a filter bank, in operation 426. The filter bank corresponds to what was described above, so the description will be omitted herein.

Once the frequency signal is classified, a process of analyzing the classified frequency signal may be performed, in operation 428. The process of analyzing the classified frequency signal may include determining that the input sound signal has a frequency of the classified region if the magnitude of the classified frequency signal exceeds the first threshold.

Once the classified frequency signal is analyzed, a process of determining whether there is noise in the sound signal may be performed in operation 430.

If frequency signals are detected in a plurality of frequency regions, and the respective magnitudes of the detected frequency signals exceed the first threshold, the input sound signal may be classified as noise. Once the sound signal is classified as noise, the signal processing of the sound signal may be terminated.

On the other hand, if there is no noise in the sound signal, the controller 240 may determine a control command corresponding to the sound signal, and send the control command to the subject 300 to be controlled, in operations 440 and 450.

An input device, vehicle including the same, and method for controlling the vehicle in accordance with various embodiments has thus far been described.

An input device, vehicle including the input device, and method for controlling the vehicle in accordance with embodiments of the present disclosure enables manipulation of a button by analyzing a sound signal produced from the button formed for the input device. Accordingly, there is no need to have additional hardware for each button, and the layout of buttons may be easily changed.

Several embodiments have been described, but a person of ordinary skill in the art will understand and appreciate that various modifications can be made without departing the scope of the present disclosure. Thus, it will be apparent to those ordinary skilled in the art that the disclosure is not limited to the embodiments described, which have been provided only for illustrative purposes.

What is claimed is:

1. An input device comprising:
   an input unit having at least one button arranged to produce a sound signal when pressed;
   a sound collector for collecting the sound signal produced from the button;
   a memory for storing control command information corresponding to a frequency of the sound signal produced from the button; and
   a controller for determining a control command corresponding to the frequency of the sound signal produced from the button based on the information stored in the memory, and for sending the control command to a subject to be controlled,
   wherein the button comprises:
   a button frame that constitutes the body of the button;
   a button guide that supports the button frame and has a fixer installed on the inner side of the button guide;

a pressing shaft installed to protrude backward from the rear side of the button frame and having a projection located on a side of the pressing shaft; and a restoring spring that elastically supports the button frame against the button guide, and wherein the projection is formed to produce a sound signal by coming into contact with the fixer as the pressing shaft is moving along a first axis.

2. The input device of claim 1, wherein the button is formed to produce a preset sound signal.

3. The input device of claim 1, wherein the input unit comprises a first button to produce a first sound signal; and a second button to produce a second sound signal with a different frequency from that of the first sound signal.

4. The input device of claim 1, wherein the button is removably located.

5. The input device of claim 1, wherein the controller determines a control command corresponding to a frequency of a sound signal produced from the button based on the information stored in the memory regardless of where the button is located, and sends the control command to the subject to be controlled.

6. The input device of claim 1, wherein the controller converts the sound signal collected by the sound collector to a frequency signal, and classifies the frequency signal by frequency region.

7. The input device of claim 6, wherein the controller determines that the input sound signal has a frequency of a classified region if the magnitude of the classified frequency signal exceeds a first threshold.

8. The input device of claim 6, wherein the controller, if frequency signals are detected in a plurality of frequency regions, and the respective magnitudes of the detected frequency signals exceed a first threshold, classifies the input sound signal as noise.

9. A vehicle, comprising:

an input device, wherein the input device comprises an input unit having at least one button arranged to produce a sound signal when pressed;

a sound collector for collecting the sound signal produced from the button;

a memory for storing control command information corresponding to a frequency of the sound signal produced from the button; and a controller for determining a control command corresponding to the frequency of the sound signal produced from the button based on the information stored in the memory, and for sending the control command to a subject to be controlled, wherein the button comprises:

a button frame that constitutes the body of the button;

a button guide that supports the button frame and has a fixer installed on the inner side of the button guide;

a pressing shaft installed to protrude backward from the rear side of the button frame and having a projection located on a side of the pressing shaft; and a restoring spring that elastically supports the button frame against the button guide, and wherein the pressing shaft is formed to produce a sound signal when the projection comes into contact with the fixer as the pressing shaft is moving along a first axis.

10. The vehicle of claim 9, wherein the button is formed to produce a preset sound signal.

11. The vehicle of claim 9, wherein the input unit comprises a first button to produce a first sound signal; and a second button to produce a second sound signal with a different frequency from that of the first sound signal.

12. The vehicle of claim 9, wherein the button is removably located.

13. The vehicle of claim 9, wherein the controller determines a control command corresponding to a frequency of a sound signal produced from the button based on the information stored in the memory regardless of where the button is located, and sends the control command to the subject to be controlled.

* * * * *